(12) United States Patent
Itagaki et al.

(10) Patent No.: US 10,243,645 B2
(45) Date of Patent: Mar. 26, 2019

(54) TERMINAL DEVICE, METHOD FOR ALLOWING TERMINAL DEVICE TO PARTICIPATE IN RELAY TRANSFER, AND METHOD FOR INVITING TERMINAL DEVICE TO RELAY TRANSFER

(71) Applicant: SONY CORPORATION, Tokyo (JP)

(72) Inventors: Takeshi Itagaki, Saitama (JP); Yoshihiko Ikenaga, Tokyo (JP); Tadashi Ehara, Kanagawa (JP); Shinji Takae, Tokyo (JP); Tomoaki Matsumura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 127 days.

(21) Appl. No.: 15/104,617

(22) PCT Filed: Dec. 17, 2014

(86) PCT No.: PCT/JP2014/083485
§ 371 (c)(1),
(2) Date: Jun. 15, 2016

(87) PCT Pub. No.: WO2015/098667
PCT Pub. Date: Jul. 2, 2015

(65) Prior Publication Data
US 2016/0315690 A1    Oct. 27, 2016

(30) Foreign Application Priority Data

Dec. 26, 2013 (JP) ................. 2013-270492

(51) Int. Cl.
| | |
|---|---|
| *H04W 4/80* | (2018.01) |
| *H04W 88/04* | (2009.01) |
| *H04B 7/155* | (2006.01) |
| *H04W 8/00* | (2009.01) |
| *H04W 40/12* | (2009.01) |
| *H04W 8/22* | (2009.01) |

(52) U.S. Cl.
CPC .......... *H04B 7/15592* (2013.01); *H04W 4/80* (2018.02); *H04W 8/00* (2013.01);
(Continued)

(58) Field of Classification Search
CPC ...... H04B 7/15592; H04W 8/00; H04W 8/22; H04W 88/04; H04W 4/80; Y02D 70/00;
(Continued)

(56) References Cited

U.S. PATENT DOCUMENTS

2009/0325622 A1* 12/2009 Matsumura .......... H04B 7/2606
455/522
2010/0279647 A1* 11/2010 Jacobs .................... G06F 19/00
455/404.1
(Continued)

FOREIGN PATENT DOCUMENTS

| JP | 2003-229954 A | 8/2003 |
|---|---|---|
| JP | 2005-323266 A | 11/2005 |

(Continued)

*Primary Examiner* — Paul H Masur
(74) *Attorney, Agent, or Firm* — Xsensus, LLP

(57) ABSTRACT

A terminal search unit searches for a predetermined transmitter terminal. A determination unit determines whether to participate in relay transfer involved in data transmission from the predetermined transmitter terminal found by the terminal search unit to a predetermined receiver terminal, using information possessed by the terminal device. A notification unit notifies the predetermined transmitter terminal of participation when the determination unit determines that the terminal device participates. It is possible to satisfactorily participate in relay transfer involved in data transmission from the predetermined transmitter terminal.

8 Claims, 13 Drawing Sheets

(52) U.S. Cl.
CPC ............ *H04W 8/22* (2013.01); *H04W 40/12* (2013.01); *H04W 88/04* (2013.01); *Y02D 70/00* (2018.01); *Y02D 70/1262* (2018.01); *Y02D 70/142* (2018.01); *Y02D 70/144* (2018.01); *Y02D 70/146* (2018.01); *Y02D 70/34* (2018.01)

(58) Field of Classification Search
CPC ............ Y02D 70/126; Y02D 70/1262; Y02D 70/1264; Y02D 70/142; Y02D 70/146; Y02D 70/144; Y02D 70/30; Y02D 70/32; Y02D 70/324; Y02D 70/326; Y02D 70/34
See application file for complete search history.

(56) References Cited

U.S. PATENT DOCUMENTS

| | | | | |
|---|---|---|---|---|
| 2012/0122431 | A1* | 5/2012 | Moon | H04M 1/7253 455/414.1 |
| 2014/0204834 | A1* | 7/2014 | Singh | H04W 40/22 370/315 |
| 2015/0038136 | A1* | 2/2015 | Wu | H04W 48/08 455/434 |
| 2015/0230180 | A1* | 8/2015 | Lim | H04W 52/0235 370/311 |
| 2015/0295634 | A1* | 10/2015 | Zhang | H04W 8/005 370/315 |
| 2015/0382159 | A1* | 12/2015 | Kim | H04W 4/08 370/312 |
| 2016/0198516 | A1* | 7/2016 | Kim | H04W 76/14 370/312 |

FOREIGN PATENT DOCUMENTS

| | | |
|---|---|---|
| JP | 2007-096988 A | 4/2007 |
| JP | 2009-246419 A | 10/2009 |
| JP | 4856084 B | 1/2012 |
| JP | 2013-197756 A | 9/2013 |

\* cited by examiner

FIG. 11

| TERMINAL INFORMATION | | PUBLIC NETWORK WIRELESS CONNECTION INFORMATION | | | SHORT-RANGE WIRELESS CONNECTION INFORMATION | | STATE | CONDITION FOR PARTICIPATION |
|---|---|---|---|---|---|---|---|---|
| ID | AMOUNT OF CHARGE REMAINING IN BATTERY | REMAINING CAPACITY OF AVAILABLE COMMUNICATION | SERVICE PROVIDER | COMMUNICATION SCHEME | CELL ID | ESTIMATED MAXIMUM THROUGHPUT | SUPPORTED FREQUENCY BAND | | |
| A | 90% | 5.0GB | SERVICE PROVIDER A | LTE | 0x12345678 | 30Mbps | 2.4GHz | CURRENTLY PARTICIPATING IN RELAY | BY 15:00 AT LEAST 40% OF BATTERY |
| B | 60% | 4.0GB | SERVICE PROVIDER B | LTE | 0x87654321 | 62Mbps | 2.4GHz/5GHz | CURRENTLY PARTICIPATING IN RELAY | NO CONDITION |
| C | 70% | 6.5GB | SERVICE PROVIDER A | W-CDMA | 0x9abcdef0 | 50Mbps | 2.4GHz | NOT PARTICIPATING | NO CONDITION |

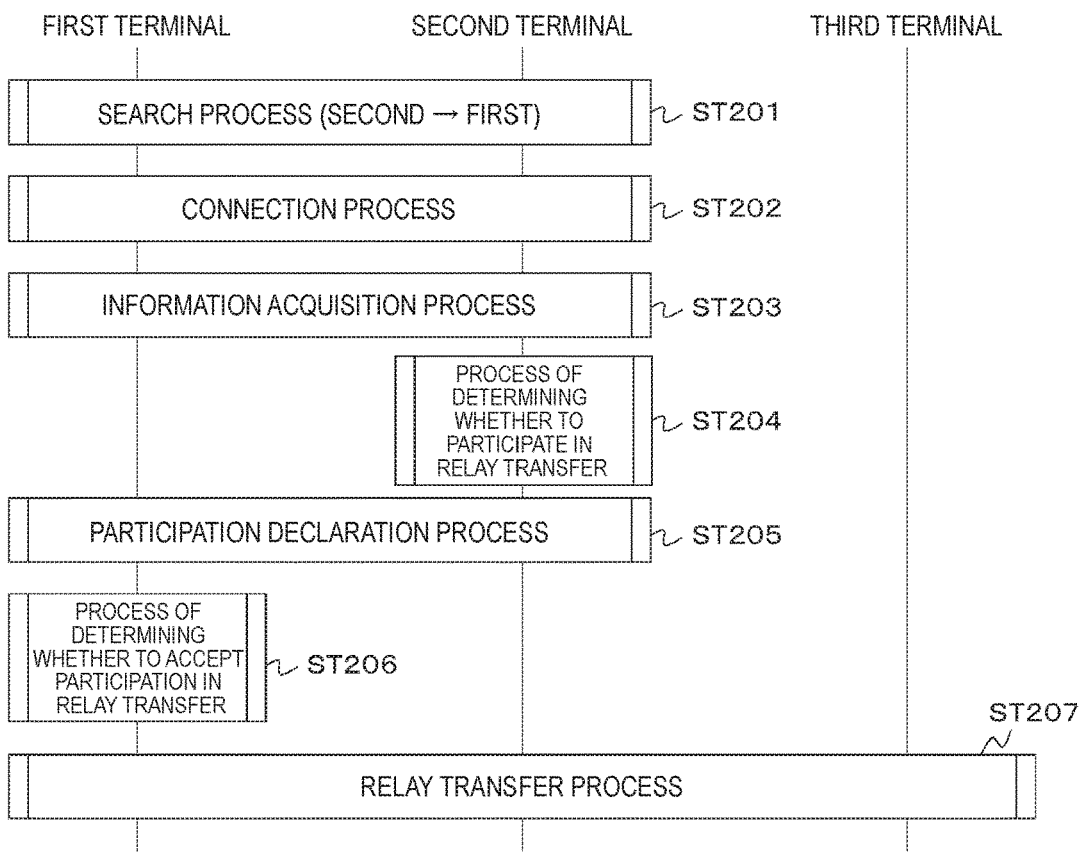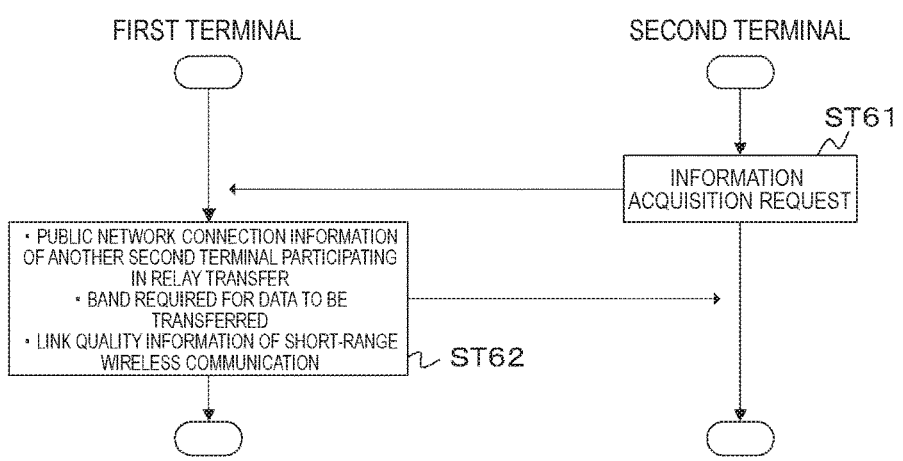

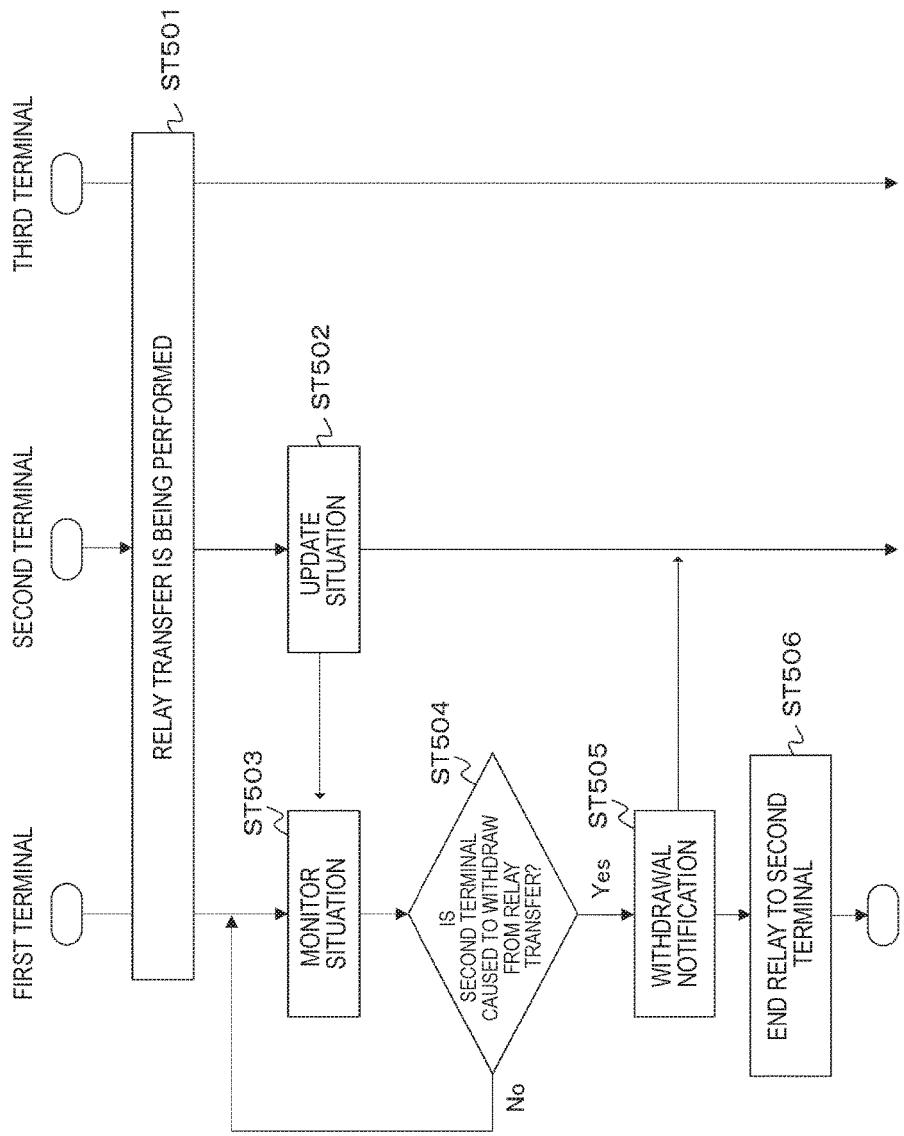

TERMINAL DEVICE, METHOD FOR ALLOWING TERMINAL DEVICE TO PARTICIPATE IN RELAY TRANSFER, AND METHOD FOR INVITING TERMINAL DEVICE TO RELAY TRANSFER

CROSS REFERENCE TO RELATED APPLICATIONS

This application is a U.S. National Phase of International Patent Application No. PCT/JP2014/083485 filed on Dec. 17, 2014, which claims priority benefit of Japanese Patent Application No. JP 2013-270492 filed in the Japan Patent Office on Dec. 26, 2013. Each of the above-referenced applications is hereby incorporated herein by reference in its entirety.

TECHNICAL FIELD

The present technology relates to terminal devices, methods for allowing a terminal device to participate in relay transfer, and methods for inviting a terminal device to relay transfer. More particularly, the present technology relates to terminal devices involved in data transfer during data transmission from a transmitter terminal to a receiver terminal, and the like.

BACKGROUND ART

Mobile communication over public networks has been widespread because of its convenience. In public networks, a terminal is wirelessly connected to a base station, which allows a number of network services, such as the Internet and the like, to be available through a service provider's network. Moreover, the technique of allowing a terminal to connect to a network through another terminal is also known (see, for example, Patent Literature 1).

CITATION LIST

Patent Literature

Patent Literature 1: JP 4856084B

SUMMARY OF INVENTION

Technical Problem

While the evolution of communication schemes has been increasing the communication speed of public networks, the size of data handled in network services has tended to increase year after year. For example, it takes a long time to complete uploading of a recorded video having high image quality and a long running time, or the like, using a single connected line because the data size of such a video is considerably large.

This problem can be solved by adopting an approach of simultaneously using a plurality of lines. However, if there is the cost of maintaining the lines, the cost continues to exist no matter whether the lines are being used for uploading. If a scheme to dynamically add or remove a line which is contracted for another purpose can be provided instead of using a fixed dedicated line contract or the like, a flexible transfer system can be implemented.

It is an object of the present technology to carry out satisfactory data transfer over public networks.

Solution to Problem

A concept of the present technology is a terminal device including: a terminal search unit that searches for a predetermined transmitter terminal; a determination unit that determines whether to participate in relay transfer involved in data transmission (data transfer) from the predetermined transmitter terminal found by the terminal search unit to a predetermined receiver terminal, using information possessed by the terminal device; and a notification unit that notifies the predetermined transmitter terminal of participation when the determination unit determines that the terminal device participates.

In the present technology, the terminal search unit searches for a predetermined transmitter terminal. The determination unit determines whether to participate in relay transfer involved in data transmission from the predetermined transmitter terminal found by the terminal search unit to a predetermined receiver terminal, using information possessed by the terminal device. The notification unit notifies the predetermined transmitter terminal of participation when the determination unit determines that the terminal device participates. For example, a message which declares participation is transmitted.

For example, the predetermined transmitter terminal may communicate with the terminal device using short-range wireless communication, and the predetermined receiver terminal may communicate with the terminal device through a public wireless network. For example, the information possessed by the terminal device may include at least one of public network wireless connection information, terminal information, and external compulsory participation request information. In this case, for example, the terminal information may include at least one of information about a battery's remaining power, information about available communication capacity, and information indicating whether communication is currently performed for another purpose.

Thus, in the present technology, when a predetermined transmitter terminal is found, the terminal device determines whether to participate in relay transfer involved in data transmission from the transmitter terminal to a predetermined receiver terminal, and when determining to participate, sends a participation notification to the transmitter terminal. Therefore, the terminal device can satisfactorily participate in relay transfer involved in data transmission from a predetermined transmitter terminal to a predetermined receiver terminal.

In the present technology, for example, the terminal device may further includes: an information reception unit that receives information about the relay transfer from the transmitter terminal found by the terminal search unit. The determination unit may perform the determination using the information received by the information reception unit in addition to the information possessed by the terminal device. For example, the received information may include at least one of public network connection information of another terminal device participating in relay transfer, information about data to be transferred, short-range wireless connection information with the terminal device, and grant incentive information. In this case, the terminal device determines whether to participate, additionally taking into account information about the predetermined transmitter terminal, and therefore, the terminal device can be more appropriately determine whether to participate.

Another concept of the present technology is a terminal device including: a notification reception unit that receives a participation notification of relay transfer from a predetermined terminal device; a determination unit that determines whether to accept participation of the predetermined terminal device in relay transfer when the notification reception unit receives the participation notification; and a data transmission unit that transmits transmission data to the predetermined receiver terminal through the predetermined terminal device when the determination unit determines to accept the participation.

In the present technology, the notification reception unit receives a relay transfer participation notification from a predetermined terminal device. The determination unit determines whether to accept participation of the predetermined terminal device in relay transfer when the notification reception unit receives the participation notification. The data transmission unit transmits transmission data to the predetermined receiver terminal through the predetermined terminal device when the determination unit determines to accept the participation. As a result, data transmission to the predetermined receiver terminal can be performed after having caused the predetermined terminal device to participate in relay transfer.

Another concept of the present technology is a terminal device including: an information reception unit that receives information from a predetermined terminal device connected at a data link level; a determination unit that determines whether to invite the predetermined terminal device to relay transfer involved in data transmission to a predetermined receiver terminal, using the information received by the information reception unit and information possessed by the terminal device; and a notification unit that notifies the predetermined terminal device of invitation when the determination unit determines to invite the predetermined terminal device.

In the present technology, the information reception unit receives information from a predetermined terminal device connected at a data link level. The determination unit determines whether to invite the predetermined terminal device to relay transfer involved in data transmission to a predetermined receiver terminal, using the information received by the information reception unit and information possessed by the terminal device. The notification unit notifies the predetermined terminal device of invitation when the determination unit determines to invite.

For example, the predetermined terminal device may communicate with the terminal device using short-range wireless communication, and the predetermined receiver terminal may communicate with the predetermined terminal device through a public wireless network. The received information may include one of public network wireless connection information, terminal information, and transfer participation condition information. The information possessed by the terminal device may include one of public network connection information of another terminal device participating in relay transfer, information about data to be transferred, and short-range wireless connection information with the predetermined terminal device.

Thus, in the present technology, the terminal device determines whether to invite a predetermined terminal device connected at a data link level to relay transfer involved in data transmission to a predetermined receiver device, and when determining to invite, sends an invitation notification to the predetermined terminal device. Therefore, the terminal device can satisfactorily invite a predetermined terminal device to relay transfer involved in data transmission to a predetermined receiver device.

In the present technology, the terminal device may further include: a data transmission unit that transmits transmission data to the predetermined terminal device when the terminal device is notified of participation in relay transfer by the predetermined terminal device in response to the invitation notification. As a result, data transmission to the predetermined receiver terminal can be performed after having caused the predetermined terminal device to participate in relay transfer.

Another concept of the present technology is a terminal device including: a notification reception unit that receives an invitation notification to relay transfer involved in data transmission to a predetermined receiver terminal, from a predetermined transmitter terminal connected at a data link layer level; a determination unit that determines whether to accept the invitation to relay transfer when the notification reception unit receives the invitation notification; and a notification unit that notifies the predetermined terminal device of participation in relay transfer when the determination unit determines to accept the invitation.

In the present technology, the notification reception unit receives an invitation notification to relay transfer involved in data transmission to a predetermined receiver terminal, from a predetermined transmitter terminal connected at a data link layer level. The determination unit determines whether to accept the invitation to relay transfer when the notification reception unit receives the invitation notification. The notification unit notifies the predetermined terminal device of participation in relay transfer when the determination unit determines to accept the invitation. As a result, the terminal device can satisfactorily participate in relay transfer involved in data transmission from a predetermined transmitter terminal to a predetermined receiver terminal.

Another concept of the present technology is a terminal device including: a determination unit that determines whether to withdraw from relay transfer involved in data transmission from a predetermined transmitter terminal to a predetermined receiver terminal, using information possessed by the terminal device; and a notification unit that notifies the predetermined transmitter terminal of withdrawal when the determination unit determines that the terminal device withdraws.

In the present technology, the determination unit determines whether to withdraw from relay transfer involved in data transmission from a predetermined transmitter terminal to a predetermined receiver terminal, using information possessed by the terminal device. The notification unit notifies the predetermined transmitter terminal of withdrawal when the determination unit determines that the terminal device withdraws.

For example, the predetermined transmitter terminal may communicate with the terminal device using short-range wireless communication, and the predetermined receiver terminal may communicate with the terminal device through a public wireless network. For example, the information possessed by the terminal device may include at least one of public network wireless connection information, terminal information, short-range wireless connection information, transfer withdrawal condition information, and external compulsory withdrawal information.

Thus, in the present technology, the terminal device determines whether to withdraw from relay transfer involved in data transmission from a predetermined transmitter terminal to a predetermined receiver terminal, and when determining to withdraw, sends a withdraw notification to the predetermined transmitter terminal. Therefore, the terminal device can satisfactorily withdraw from relay transfer involved in data transmission from a predetermined transmitter terminal to a predetermined receiver terminal.

Another concept of the present technology is a terminal device including: a determination unit that determines whether to cause a predetermined terminal device to withdraw from relay transfer involved in data transmission from the terminal device to a predetermined receiver terminal, using information possessed by the terminal device and information received from the predetermined terminal device; and a notification unit that notifies the predetermined terminal device of withdrawal from relay transfer when the determination unit determines to cause the predetermined terminal device to withdraw.

In the present technology, the determination unit determines whether to cause a predetermined terminal device to withdraw from relay transfer involved in data transmission from the terminal device to a predetermined receiver terminal, using information possessed by the terminal device and information received from the predetermined terminal device. The notification unit notifies the predetermined terminal device of withdrawal from relay transfer when the determination unit determines to cause the predetermined terminal device to withdraw.

For example, the predetermined terminal device may communicate with the terminal device using short-range wireless communication, and the predetermined receiver terminal may communicate with the predetermined terminal device through a public wireless network. For example, the received information may include at least one of public network wireless connection information, terminal information, short-range wireless connection information, transfer withdrawal condition information, and external compulsory withdrawal information. The information possessed by the terminal device includes at least one of public network connection information of another terminal device participating in relay transfer, information about data to be transferred, and short-range wireless connection information with the predetermined terminal device.

Thus, in the present technology, the terminal device determines whether to cause a predetermined terminal device to withdraw from relay transfer involved in data transmission to a predetermined receiver terminal, and when determining to cause the predetermined terminal device to withdraw, sends a withdrawal notification to the predetermined terminal device. Therefore, the terminal device can satisfactorily cause a predetermined terminal device to withdraw from relay transfer involved in data transmission to a predetermined receiver terminal.

Effects

According to the present technology, data transfer through a public network can be satisfactorily performed. Moreover, the above advantages are not limiting in any way, and any of advantages described herein may be achieved.

BRIEF DESCRIPTION OF DRAWINGS

FIG. 11 is a diagram showing an example of contents of a table (relay participation terminal management table) to which information contained in a participation declaration message is added.

FIG. 12 is a flowchart showing an example of a process performed by each terminal in Example 2.

FIG. 13 is a flowchart showing an example of a process of acquiring information from a first terminal, which is performed by a second terminal.

FIG. 17 is a flowchart showing an example of a process performed by each terminal in Example 5.

DESCRIPTION OF EMBODIMENT(S)

Modes for carrying out of the present disclosure (hereinafter referred to as "embodiments") will now be described. Moreover, the description will be provided in the following order.
1. Embodiments
2. Variations

1. EMBODIMENTS

Configuration Example of Communication System

Figure 1:
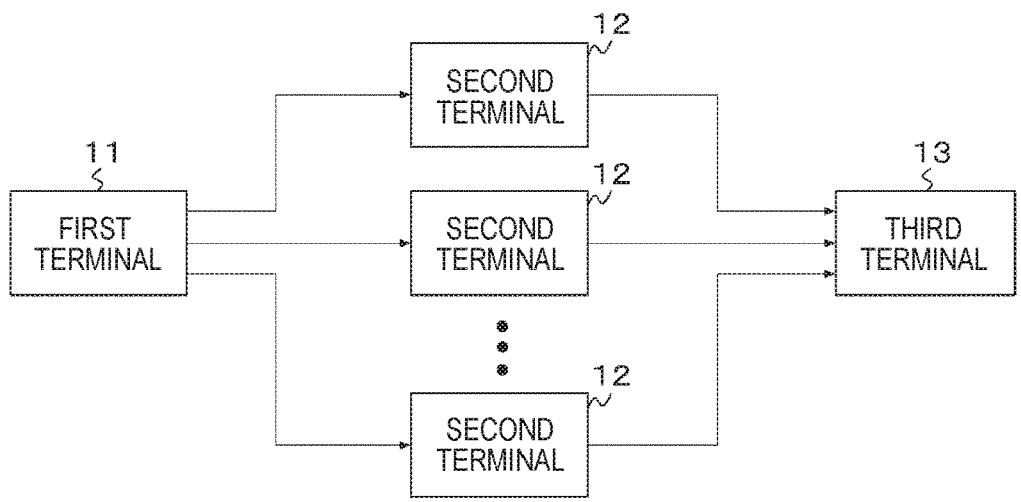
FIG. 1 is a block diagram showing a configuration example of a communication system according to an embodiment.

FIG. 1 shows a configuration example of a communication system 10 according to an embodiment. The communication system 10 includes a first terminal 11 serving as a transmitting and receiving side, a third terminal 13 serving as a transmission destination and a reception source, and one or more second terminals 12 serving as a relay for transmission and reception. The second terminals 12 can dynamically participate in or withdraw from the communication system 10.

Figure 2:
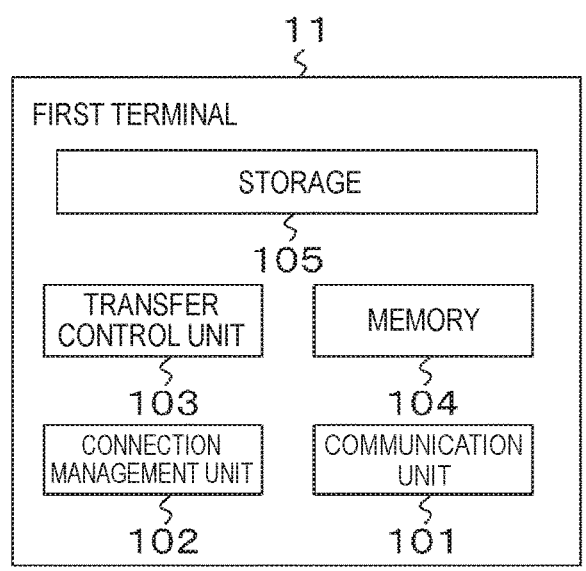
FIG. 2 is a diagram showing a configuration example of a second terminal in a communication system.

FIG. 2 shows a configuration example of the first terminal 11. The first terminal 11 includes a communication unit 101, a connection management unit 102, a transfer control unit 103, a memory 104, and a storage 105. The communication unit 101 performs addition of a header and an error detection code and modulation during transmission, and demodulation, analysis of header information, reordering, and the like during reception. In this embodiment, it is assumed that the communication unit 101 has a communication scheme for allowing communication with the second terminals 12.

The transfer control unit 103, when transferring data in the storage 105 to the third terminal 13, performs control to divide the data into portions for the respective second terminals 12. Conversely, the transfer control unit 103, when receiving data from the third terminal 13, performs a process of putting portions of data relayed by the second terminals 12 together to reconstruct their original form as it was in the third terminal 13. Thereafter, in some cases, the reconstructed data in its original form is stored in the storage 105.

The connection management unit 102 manages the statuses of connection to one or more second terminals 12 which are detected within a communication range. Specifically, the connection management unit 102 determines whether to allow the second terminal(s) 12 to participate in transfer to the third terminal 13, or whether to allow the second terminal(s) 12 participating in transfer to the terminal 13 to withdraw.

Figure 3:
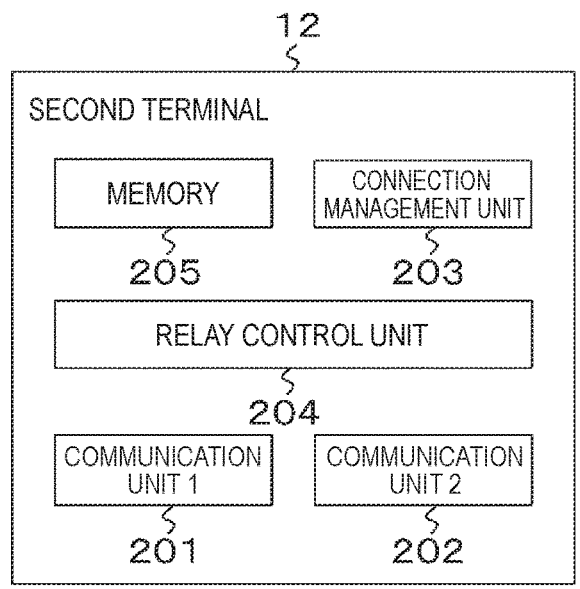
FIG. 3 is a diagram showing a configuration example of a third terminal in a communication system.

FIG. 3 shows a configuration example of the second terminal 12. The second terminal 12 includes a plurality of (two in FIG. 3) communication units 201 and 202, a connection management unit 203, a relay control unit 204, and a memory 205. The communication units 201 and 202 have a role similar to that of the communication unit 101 of the first terminal 11. The second terminal 12 is connected to the first terminal 11 through the communication unit 201, and to the third terminal 13 through the communication unit 202.

The connection management unit 203 manages the statuses of connection of the communication units 201 and 202. Specifically, the connection management unit 203 performs a process of searching for and connecting to the first terminal 11, or when receiving a relay request from the first terminal 11, performs a process of determining whether to participate in data relay, depending on the situation. The relay control unit 204 performs a process of relaying data received from the first terminal 11 through the communication unit 201, to the third terminal 13 through the communication unit 202, or conversely, a process of relaying data received from the third terminal 13, to the first terminal 11. The relay control unit 204 also optionally performs a process of changing protocols.

Figure 4:
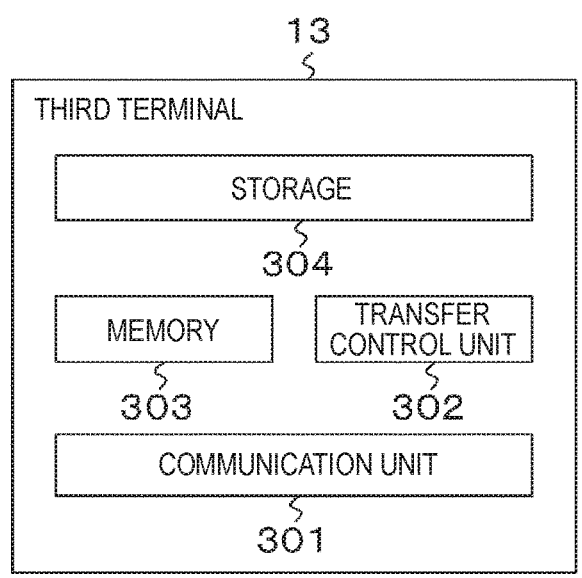
FIG. 4 is a diagram showing a configuration example of a first terminal in a communication system.

FIG. 4 shows a configuration example of the third terminal 13. The third terminal 13 has a communication unit 301, a transfer control unit 302, a memory 303, and a storage 304. The communication unit 301 has a role similar to that of the communication unit 101 of the first terminal 11. The transfer control unit 302, when receiving data from the first terminal 11, performs a process of putting portions of data relayed from the second terminals 12 together to reconstruct their original form as it was in the first terminal 11. Thereafter, in some cases, the transfer control unit 302 stores the reconstructed data to the storage 304. Conversely, the transfer control unit 302, when transferring data in its own storage 304 to the first terminal 11, performs control to divide the data into portions for the respective second terminals 12.

Specific Examples

A method for dynamically configuring a system will be described using five examples 1-5, focusing on operations of the connection management unit 102 of the first terminal 11 and the connection management unit 203 of the second terminal 12. Here, Examples 1-3 are of dynamic participation, and Examples 4 and 5 are of dynamic withdrawal.

In the examples, for example, it is assumed that the first terminal 11 is a personal computer (PC), the second terminal 12 is a mobile terminal, such as a smartphone or the like, and the third terminal 13 is a server in a cloud (a computer network, such as the Internet or the like). Moreover, the present technology is not limited to this. It is assumed that the first terminal 11 and the second terminals 12 communicate with each other via short-range wireless technologies, and the second terminal communicates with the third terminal 13 over a public wireless network.

Figure 5:
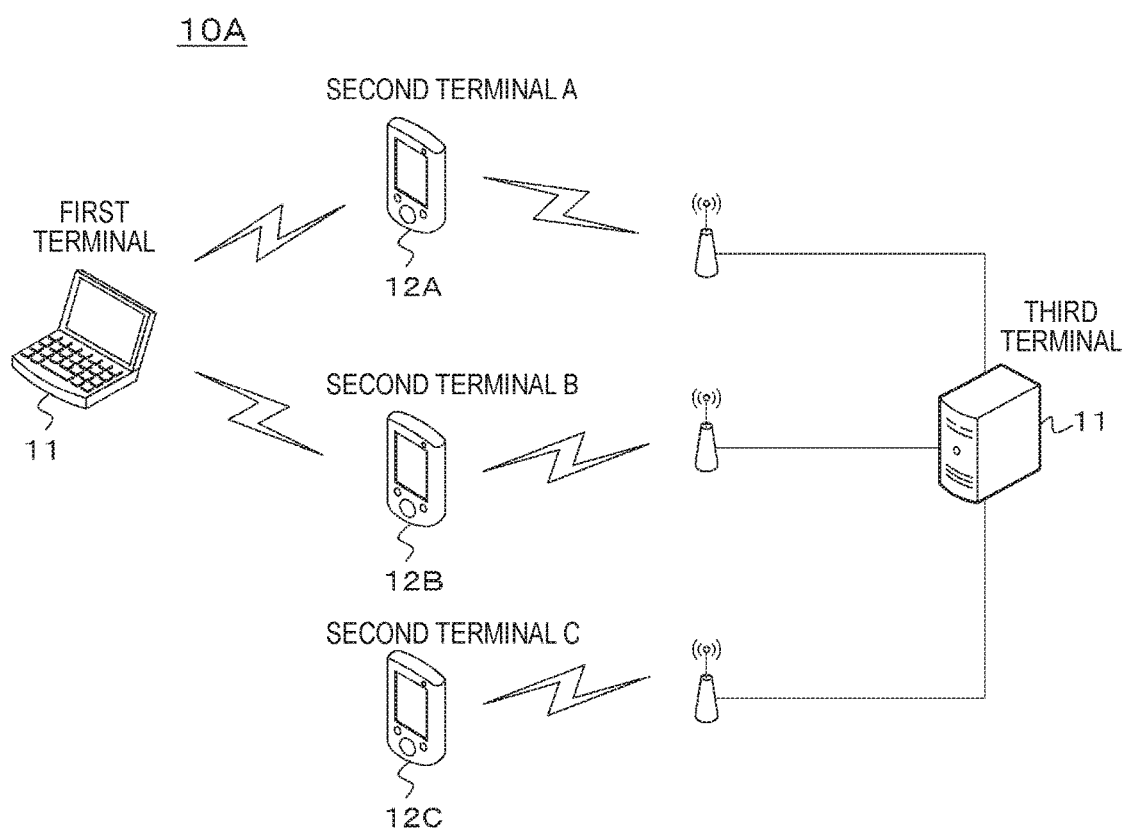
FIG. 5 is a block diagram showing a configuration example of a communication system of Example 1.

Example 1: A Second Terminal Voluntarily Searches for the First Terminal and Participates in Transfer FIG. 5 shows a configuration example of a communication system 10A of Example 1. The communication system 10A includes a first terminal (PC) 11, second terminals (mobile terminals) 12A, 12B, and 12C near the first terminal 11, and a third terminal (server) 13. The second terminals 12A and 12B are connected to the first terminal 11, and participate in relay of data transfer (data transmission) from the first terminal 11 to the third terminal 13. The second terminal 12C has not yet been connected to the first terminal 11, and has not participated in relay of data transfer (data transmission) from the first terminal 11 to the third terminal 13.

Figure 6:
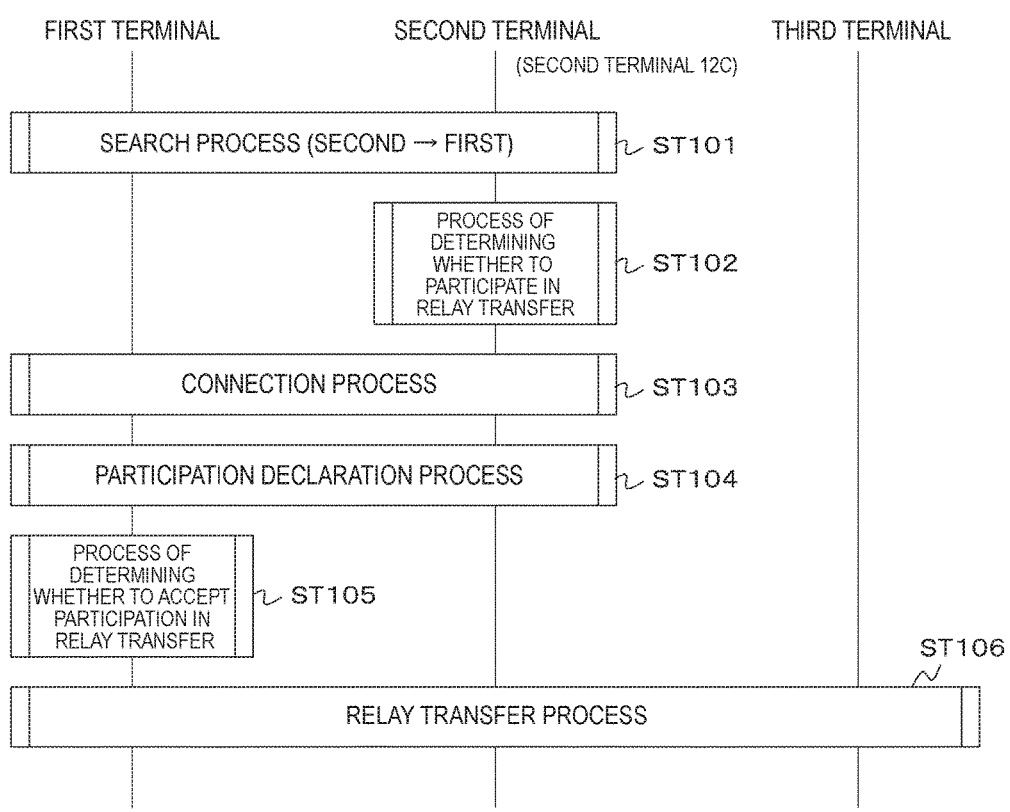
FIG. 6 is a flowchart showing an example of a process performed by each terminal in Example 1.

A flowchart of FIG. 6 shows a process example of each terminal. A second terminal in FIG. 6 indicates the second terminal 12C in FIG. 5. A process performed until the second terminal participates in relay to perform transfer is roughly divided into six processes (steps). Specifically, the six processes are a first terminal search process (step ST101), a relay transfer participation determination process (in the second terminal) (step ST102), a connection process (step ST103), a participation declaration process (step ST104), a process of determining whether to accept participation in relay transfer (in the first terminal) (step ST105), and an actual relay transfer process (step ST106).

Figure 7:
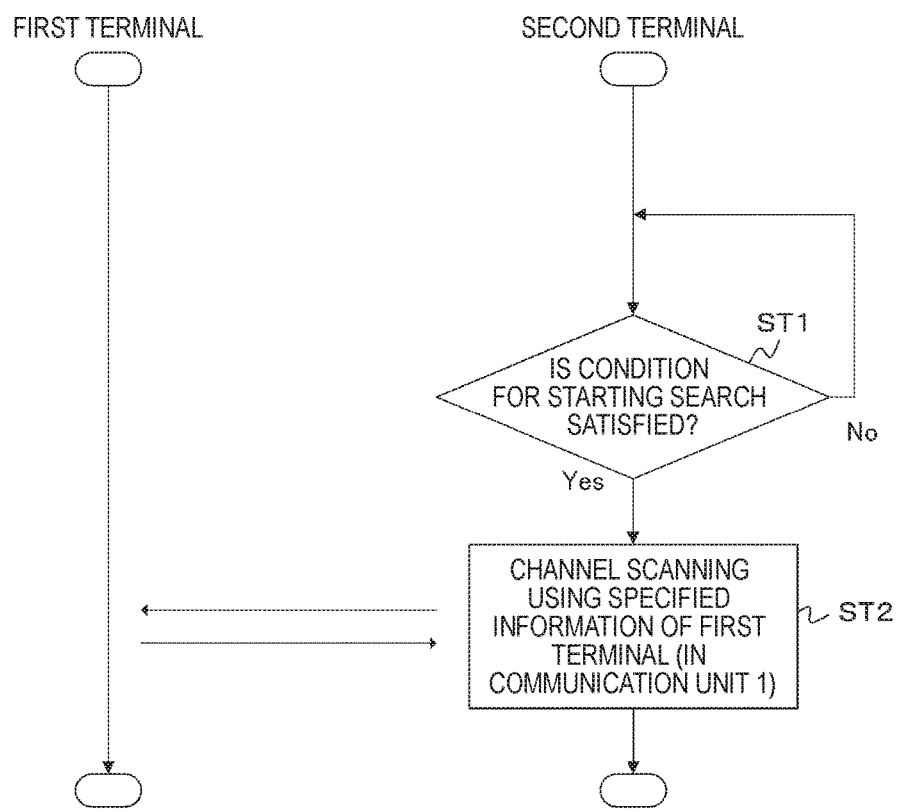
FIG. 7 is a flowchart showing the flow of a process of searching for a first terminal, which is performed by a second terminal.

A flowchart of FIG. 7 shows the flow of the process of step ST101, i.e., the flow of a process of allowing a second terminal to search for the first terminal. The second terminal is not always connected to the first terminal, and is optionally connected to the first terminal to participate in relay transfer. Initially, in step ST1, the second terminal waits for occurrence of a trigger for starting the search. Specifically, in step ST1, the second terminal determines whether a condition(s) for starting the search is satisfied.

Examples of the condition for starting the search include:

a specific time has arrived (a time slot in which the second terminal is allowed to participate in relay has arrived)

the second terminal arrives in a specific place (the current position of the second terminal is in the vicinity of a known position information of the first terminal)

a notification of a request for search is received from the third terminal or the Internet network These conditions may be used either in isolation or in combination.

If the search start condition is satisfied, the second terminal starts searching for the first terminal in step ST2. In this case, the second terminal performs channel scanning using specified information (identification information) of the first terminal.

Examples of the information of the first terminal include:

a network identifier (802.11 ESSID, 802.15.4 PAN ID, etc.) produced by the first terminal a device name of the first terminal a service name provided by the first terminal These items of information may be used either in isolation or in combination.

These items of information are preset, input by the user, or determined according to an instruction from the Internet network. The second terminal searches for the first terminal using these items of information. In Example 1, short-range wireless connection is assumed, and therefore, specifically, channel scanning (active scan or passive scan) is performed, and these items of information are used to filter the results.

If the second terminal finds the first terminal by the process of step ST101, then the second terminal performs, in step ST102, a process of determining whether to participate in relay transfer. In this case, the second terminal determines whether to participate in relay transfer, on the basis of information possessed by itself, such as public network wireless connection information, terminal information, external compulsory participation request information, etc. More specifically, the second terminal determines whether to participate in relay transfer, on the basis of the following information, for example:

whether public network wireless connection to the third terminal is within range whether the amount of charge remaining in the battery in the second terminal is sufficient whether the communication capacity available for transfer in public network wireless connection is sufficient whether the second terminal is using public network wireless communication for another purpose The second terminal determines whether sufficient performance can be provided in transfer, using the above items of information either in isolation or in combination. A threshold for each determination is assumed to be previously determined. Also, if the use of the second terminal is limited to business purposes or the like, or a request for compulsory participation is issued from a cloud such as the third terminal or the like, or the like, the second terminal may determine that the second terminal can participate, irrespective of determination based on other information.

Figure 8:
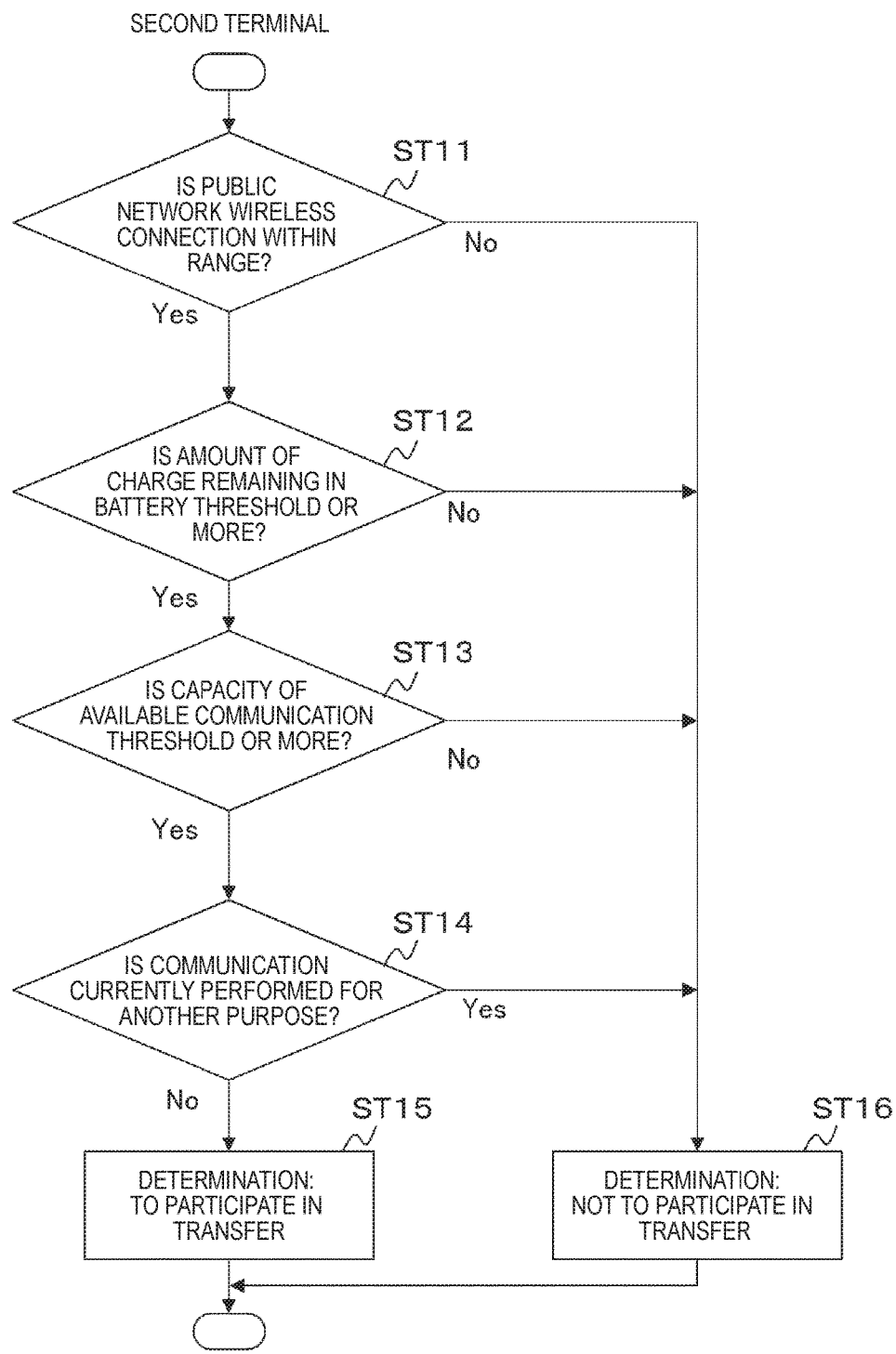
FIG. 8 is a flowchart showing the flow of a process of determining whether to participate in relay transfer, which is performed by a second terminal.

A flowchart of FIG. 8 shows an example of a process of determining whether to participate in relay transfer, which is performed in the second terminal. Initially, in step ST11, the second terminal determines whether public network wireless connection is within range. If public network connection is within range, the second terminal determines whether the amount of charge remaining in the battery is a threshold or more, in step ST12. If the amount of charge remaining in the battery is the threshold or more, the second terminal determines whether the available communication capacity is a threshold or more, in step ST13. If the available communication capacity is the threshold or more, the second terminal determines whether communication is being currently performed for another purpose, in step ST14.

If, in step ST14, communication is not being currently performed for any other use, the second terminal determines that "the second terminal can participate in relay transfer," in step ST15. Meanwhile, if, in step ST11, public network wireless connection is not within range, if, in step ST12, the amount of charge remaining in the battery is not the threshold or more, if, in step ST13, the available communication capacity is not the threshold or more, or if, in step ST14, communication is being currently performed for another purpose, the second terminal determines that "the second terminal cannot participate in relay transfer," in step ST16.

If, in the relay transfer participation determination process (step ST102), it is determined that "the second terminal can participate in relay transfer," the second terminal performs a process of connecting to the first terminal, in step ST103. In this process, a general procedure depending on a short-range wireless protocol is employed, which will not be described in detail.

Figure 9:
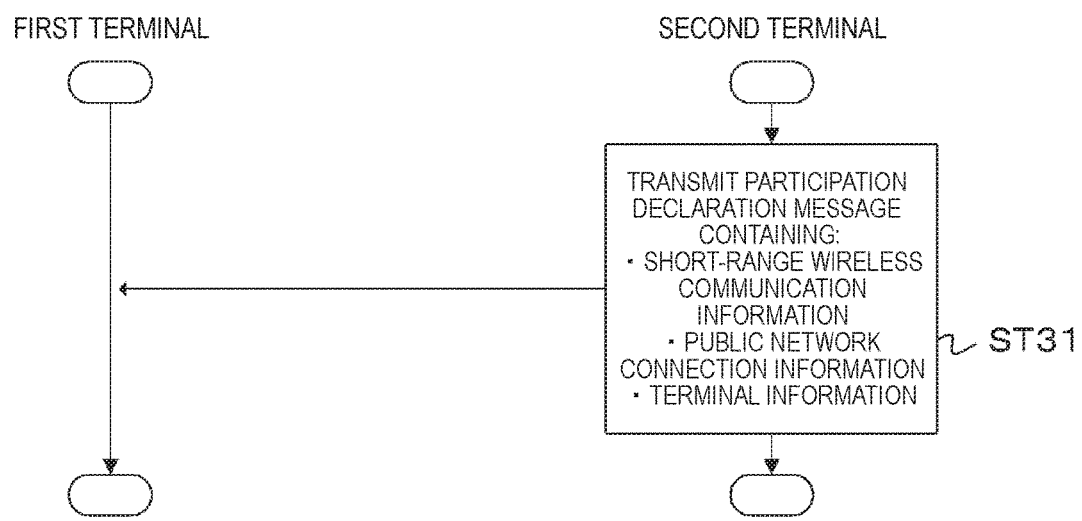
FIG. 9 is a flowchart showing the flow of a process of declaring participation with respect to a first terminal, which is performed by a second terminal.

If the connection of the second terminal and the first terminal has been completed, the second terminal performs a participation declaration process with respect to the first terminal in step ST104. A flowchart of FIG. 9 shows an example of a process of declaring participation with respect to the first terminal, which is performed by the second terminal. In step ST31, the second terminal notifies the first terminal of participation by transmitting, to the first terminal, a participation declaration message containing, for example, the following information.

Short-range wireless communication-related support function information (whether a plurality of wireless bands are supported in short-range wireless communication, etc.)

public network wireless connection information (information about the service provider of a public wireless network to which the second terminal is currently connected, communication scheme information, the identifier of a cell to which the second terminal is currently connected, reception quality information, data communication history, etc.)

other information about the second terminal (a terminal identifier, the amount of charge in the battery, the communication capacity available for transfer, etc.)

Figure 10:
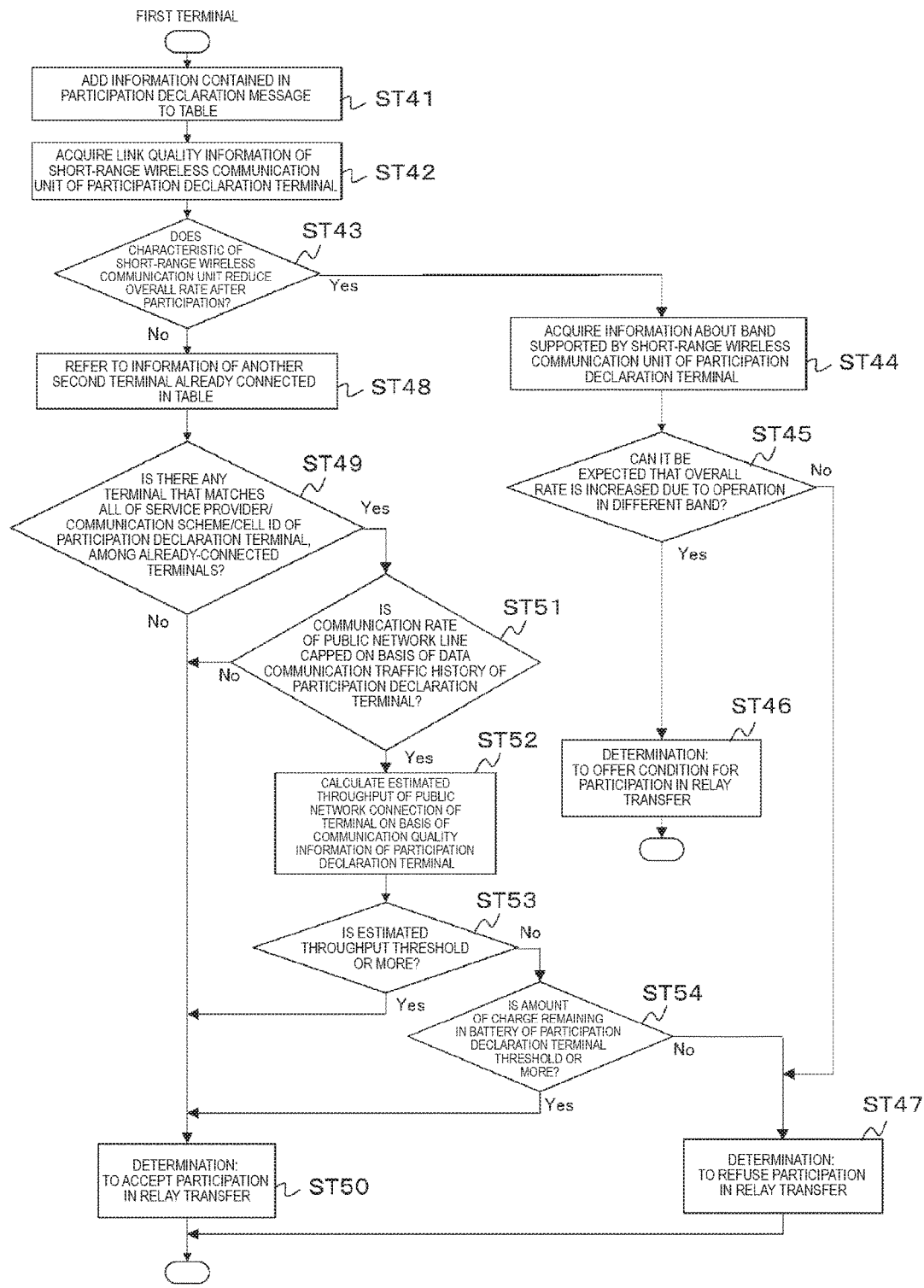
FIG. 10 is a flowchart showing the flow of a process of determining whether to accept participation of a second terminal in relay transfer, which is performed by a first terminal.

The first terminal, when receiving a participation notification from the second terminal, i.e., when receiving a participation declaration message from the second terminal, determines whether to accept participation of the second terminal in relay transfer, in step ST105. A flowchart of FIG. 10 shows an example of a process of determining whether to accept participation of the second terminal in relay transfer, which is performed in the first terminal.

In step ST41, the first terminal adds information contained in the participation declaration message to a table (relay participation terminal management table). FIG. 11 shows an example of contents of the table. Moreover, the information in the table is desirably updated as appropriate even after the connection has been established.

Next, in step ST42, the first terminal acquires the link quality of a short-range wireless communication unit for a second terminal which has sent the participation declaration message (hereinafter referred to as a "participation declaration terminal"). Examples of information indicating the link quality include:

RSSI wireless media occupancy time ratio retransmission occurrence rate modulation which can be stably used Next, in step ST43, the first terminal estimates a transmission rate which can be used in the short-range wireless communication unit, on the basis of any one or more of the above items of information indicating the link quality, and determines whether a characteristic of the short-range wireless communication unit will reduce the overall rate after participation. This is because when the radio resources of the short-range wireless communication unit are shared by a plurality of second terminals, then if a second terminal having a poor-quality short-range wireless communication unit participates, the overall transfer rate may decrease irrespective of the transmission characteristics of a public network.

Moreover, even when the link quality (estimated transmission rate) of a short-range wireless communication unit does not satisfy a predetermined threshold, then if the first terminal and the participation declaration terminal are allowed to operate at different frequency bands, the shortage of radio resources can be avoided, and therefore, the overall transfer rate may be improved. The first terminal itself supports simultaneous operation in a plurality of bands, and as a result of this process, determines to "offer a condition for participation in relay transfer" if the participation declaration terminal can operate in a different band. If both of the first terminal and the participation declaration terminal do not have such a function, the first terminal determines to "refuse participation in relay transfer."

Specifically, the first terminal, when determining in step ST43 that the overall rate will be reduced after participation, acquires information about a band supported by the participation declaration terminal in step ST44. Thereafter, in step ST45, the first terminal determines whether the overall rate can be expected to increase due to operation in a different band. If the overall rate can be expected to increase, the first terminal determines in step 46 to "offer a condition for participation in relay transfer." Meanwhile, if the overall rate cannot be expected to increase, the first terminal determines in step ST47 to "refuse participation in relay transfer."

If the first terminal determines that the link quality of the short-range wireless communication unit satisfies a predetermined threshold, then the first terminal checks the validity of public network wireless connection. Specifically, if, in step ST43, it is determined that the overall rate will not be reduced after participation, control proceeds to the process of step ST48. In step ST48, the first terminal refers to information about other second terminals already connected in the table.

Next, in step ST49, the first terminal checks whether there is a second terminal which matches all of the connection service provider, connection communication scheme (W-CDMA, LTE, WiMAX, etc.), and cell identifier of a public wireless network to which the participation declaration terminal is connected. If there is a mismatch in at least one of them, the participation declaration terminal is highly likely to be combined as public radio resources without mutual influences. If the first terminal determines that there is no already-connected terminal that matches all of them, the first terminal determines in step ST50 to "accept participation in relay transfer."

If there is a second terminal which matches all the items of connection information of a public wireless network, the radio resources of a public network portion are divided between each other, so that there may be an influence on an existing relay line, and therefore, a more specific determination is necessary. In this case, if it can be inferred that the data communication rate is capped, on the basis of information about the transition of past data communication traffic of the participation declaration terminal, it is expected that participation in transfer will not have a significant influence on an existing relay line, and participation is accepted.

If even that is not satisfied, the acceptance of participation in transfer is not expected to significantly increase the overall transfer rate. In such a case, a significant effect is not expected on the power consumption of the participation declaration terminal. Therefore, the amount of charge remaining in the battery is checked, and only if there is enough charge remaining, participation in transfer is accepted. Otherwise the first terminal determines to "refuse participation in relay transfer."

Specifically, if, in step ST49, the first terminal determines that there is an already-connected terminal which matches all, control proceeds to the process of step ST51. In step ST51, the first terminal determines whether the communication rate of the public network line is capped, on the basis of the data communication traffic history of the participation declaration terminal. If the first terminal determines that the communication rate of the public network line is not capped, the first terminal determines to "accept participation in relay transfer," in step ST50.

Also, if, in step ST51, the first terminal determines that the communication rate of the public network line is capped, the first terminal calculates an estimated throughput of public network connection of this terminal, on the basis of communication quality information of the participation declaration terminal, in step ST52. Thereafter, in step ST53, the first terminal determines whether the estimated throughput is a threshold or more. If the first terminal determines that the estimated throughput is the threshold or more, the first terminal determines to "accept participation in relay transfer," in step ST50.

If, in step ST53, the first terminal determines that the estimated throughput is not the threshold or more, the first terminal determines whether the amount of charge remaining in the battery in the participation declaration terminal is a threshold or more, in step ST54. If the amount of charge remaining in the battery is the threshold or more, the first terminal determines to "accept participation in relay transfer," in step ST50. Meanwhile, if the amount of charge remaining in the battery is not the threshold or more, the first terminal determines to "refuse participation in relay transfer," in step ST47.

There are three results of the determination processes according to the above flowchart of FIG. 10, with respect to the participation declaration terminal, i.e., "acceptance," "condition offer," and "refusal." If the determination result is "condition offer," provisional refusal of participation and a condition are sent, and another participation declaration is waited. An example of the condition is changing of operating frequency bands of short-range wireless communication.

If the determination result is "acceptance," the first terminal allows the participation declaration terminal to participate in data transfer, divides data to be transferred, and assigns a portion of the data to the participation declaration terminal, before starting transmission, in step ST106. The participation declaration terminal transfers the data portion received from the first terminal, to the third terminal, while optionally changing protocols as appropriate. The third terminal reconstructs original data from portions of data received from a plurality of second terminals. Moreover, as to the direction of transfer, the third terminal may be a transmitter while the first terminal may be a receiver.

Thus, in Example 1, when a second terminal finds the first terminal, the second terminal determines whether to participate in relay transfer involved in data transmission from the first terminal to the third terminal. If the second terminal determines to participate, the second terminal sends a participation declaration message to the first terminal. Thereafter, the first terminal, when receiving the participation declaration message from the second terminal, determines whether to accept participation of the second terminal in relay transfer. If the first terminal determines to accept, the first terminal starts data transmission to the third terminal after having caused the second terminal to participate in relay transfer. Therefore, the second terminal can satisfactorily participate in relay transfer, and increase the overall transfer rate of the system according to the situation.

Example 2: A Second Terminal is Previously Connected to the First Terminal, and Participation Declaration is Checked Using More Specific Information A communication system of Example 2 has a configuration similar to that of the communication system 10A of Example 1 (see FIG. 5). A flowchart of FIG. 12 shows an example of a process performed by each terminal. In Example 1, it is determined whether a second terminal is allowed to participate before the second terminal is connected to the first terminal. Alternatively, in this example, after search, connection is previously established and more specific information is obtained before it is determined whether a second terminal is allowed to participate.

This can reduce the case where participation is refused by the first terminal after participation declaration is performed by a second terminal. Moreover, an incentive to be provided by the first terminal when a second terminal participates in transfer can be previously offered. A specific example of the incentive may be to provide cashback or content depending on the communication capacity contributed by the second terminal.

The process until the second terminal participates in relay and starts transfer are roughly divided into seven processes (steps). Specifically, the seven processes are: a process of searching the first terminal (step ST201); a connection process (step ST202), an information acquisition process (step ST203); a process of determining whether to participate in relay transfer (in a second terminal) (step ST204); a participation declaration process (step ST205); a process of determining whether to accept participation in relay transfer (in the first terminal) (step ST206); and an actual relay transfer process (step ST207).

The process of searching for the first terminal (step ST201) and the connection process (step ST202) are similar to those of Example 1. A flowchart of FIG. 13 shows an example of the process of step ST203, i.e., the process of acquiring information from the first terminal, which is performed by a second terminal. In step ST61, the second terminal sends an information acquisition request (specific information request) to the first terminal. In response to the request, in step ST62, the first terminal provides, to the second terminal, for example, public network connection information of other terminal devices participating in relay transfer, information about data to be transferred, short-range wireless connection information with the first terminal, and grant incentive information, and the like.

More specifically, a second terminal provides, for example, the following information:

link quality information of the short-range wireless communication unit with respect to the second terminal (RSSI, a wireless media occupancy time ratio, a wireless retransmission occurrence rate, modulation which can be stably used)

public network wireless connection information of other terminals participating in relay transfer (the service provider information, communication scheme information, and connected-cell identifier of a public wireless network to which the second terminal is currently connected)

information about data to be transferred (e.g., a necessary transfer rate for streaming data)

incentive information provided to the second terminal (the amount of cashback, content provided)

A second terminal which has received information from the first terminal performs the process of determining whether to participate in relay transfer, in step ST204. In Example 2, in the "process of determining whether to participate in relay transfer" of step ST206, a second terminal performs the determination using information possessed by itself and information received from the first terminal. In other words, in the "process of determining whether to participate in relay transfer" of Example 2, the subject matter of the "process of determining whether to accept participation in relay transfer" of Example 1 is performed in addition to the subject matter of the "process of determining whether to participate in relay transfer" of Example 1. Moreover, in this case, moreover, the second terminal may determine whether to participate, using information about a transfer rate necessary for data to be transferred, and information about an offered incentive.

The participation declaration process (step ST205), the process of determining whether to accept participation in relay transfer (in the first terminal) (step ST206), and the actual relay transfer process (step ST207) are similar to those of Example 1.

Thus, in Example 2, as in Example 1, a second terminal can satisfactorily participate in relay transfer, and the overall transfer rate of the system can be increased according to the situation. In addition, in Example 2, a second terminal determines whether to participate in relay transfer, additionally taking into account information received from the first terminal. Therefore, a second terminal can more appropriately determine whether to participate.

Example 3: The First Terminal Requests a Nearby Second Terminal to Participate

A communication system of Example 3 has a configuration similar to that of the communication system 10A of Example 1 (see FIG. 5). In Example 3, the first terminal has a leading role in forming topology of transfer.

Figure 14:
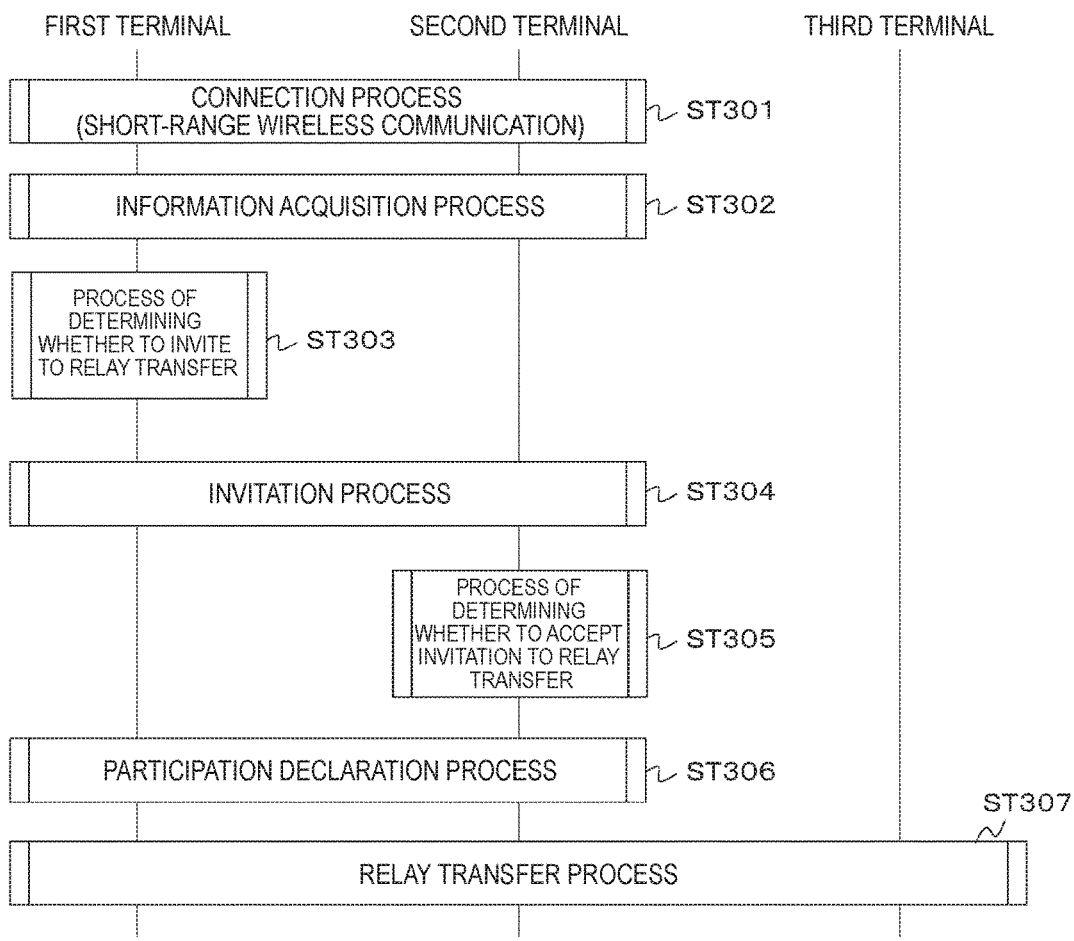
FIG. 14 is a flowchart showing an example of a process performed by each terminal in Example 3.

A flowchart of FIG. 14 shows an example of a process performed by each terminal. The process until a second terminal participates in relay and performs transfer is roughly divided into seven processes (steps). Specifically, the seven processes are: a connection process (step ST301); an information acquisition process (step ST302), a process of determining whether to invite to relay transfer (in the first terminal) (step ST303); an invitation process (step ST304); a process of determining whether to accept invitation to relay transfer (in a second terminal) (step ST305); a participation declaration process (step ST306); and an actual relay transfer process (step ST307).

Figure 15:
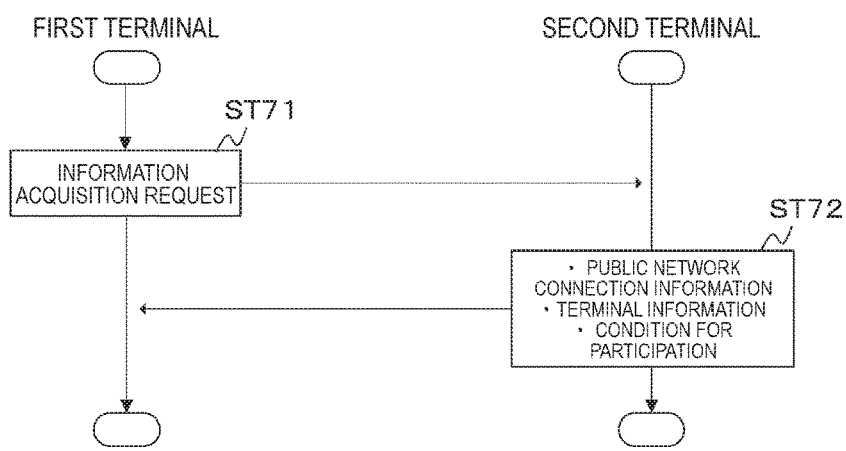
FIG. 15 is a flowchart showing an example of a process of acquiring information from a second terminal, which is performed by a first terminal.

Initially, in step ST301, the first terminal and a second terminal establish short-range wireless connection (connection at the data link level). In this state, in step ST302, the first terminal acquires information from the second terminal connected thereto. A flowchart of FIG. 15 shows an example of a process of acquiring information from a second terminal, which is performed by the first terminal. In step ST71, the first terminal sends an information acquisition request (specific information request) to the second terminal. In response to the request, the second terminal provides, to the first terminal, for example, public network wireless connection information, terminal information, information about a condition for participation in transfer, and the like, in step ST72.

Here, information which is sent from a second terminal to the first terminal as in the participation declaration process of Example 1, is provided. However, at this time, the second terminal does not intend to participate, and therefore, a condition for participation in transfer is additionally provided. Specifically, examples of such a condition may include information about a requested incentive, time at which participation is allowed, the upper limit of the amount of transfer at which participation is allowed, and the like.

In step ST303, the first terminal determines whether to invite to relay transfer, on the basis of information acquired (received) and information possessed by itself. The subject matter of this determination process is almost similar to the process of determining whether to accept participation in relay transfer of Example 1, except that determination of whether to grant an incentive is added. Moreover, examples of the information possessed by the first terminal itself include public network connection information of other terminal devices participating in relay transfer, information about data to be transferred, short-range wireless connection information with the above predetermined terminal device, and the like.

In step 304, the first terminal, when determining to invite to relay transfer, notifies the second terminal of invitation by sending a message for invitation to relay transfer. Thereafter, in step ST305, the second terminal, when receiving the notification for invitation to relay transfer from the first terminal, determines whether to accept invitation to relay transfer. This determination is similar to the process of determining whether to participate in relay transfer in Examples 1 and 2.

In step ST306, the second terminal, when determining to accept the invitation, sends a participation declaration message as a participation notification to the first terminal. In step ST307, the first terminal, when receiving the participation notification, causes the participation declaration terminal to participate in data transfer, divides data to be transferred, and assigns a portion of the data to the participation declaration terminal, and thereafter, starting transmission. The participation declaration terminal optionally changes protocols as appropriate, and transfers the data portion received from the first terminal to the third terminal. The third terminal reconstructs original data from portions of data received from a plurality of second terminals. Moreover, as to the direction of transfer, the third terminal may be a transmitter while the first terminal is a receiver.

Thus, in Example 3, the first terminal acquires information from a second terminal, and determines whether to invite the second terminal to relay transfer, and when determining to invite, notifies the second terminal of invitation. Also, a second terminal, when receiving an invitation notification from the first terminal, determines whether to accept invitation to relay transfer, and when determining to accept, notifies the first terminal 11 of participation. Thereafter, the first terminal starts data transmission to the third terminal after having caused the second terminal to participate in relay transfer. Therefore, a second terminal device can be preferably allowed to participate in relay transfer, and the overall transfer rate of the system can be increased according to the situation.

Example 4: A Second Terminal Declares Withdrawal During Relay Transfer

A communication system of Example 4 has a configuration similar to that of the communication system 10A of Example 1 (see FIG. 5). In Example 4, a second terminal voluntarily determines to withdraw from relay transfer.

Figure 16:
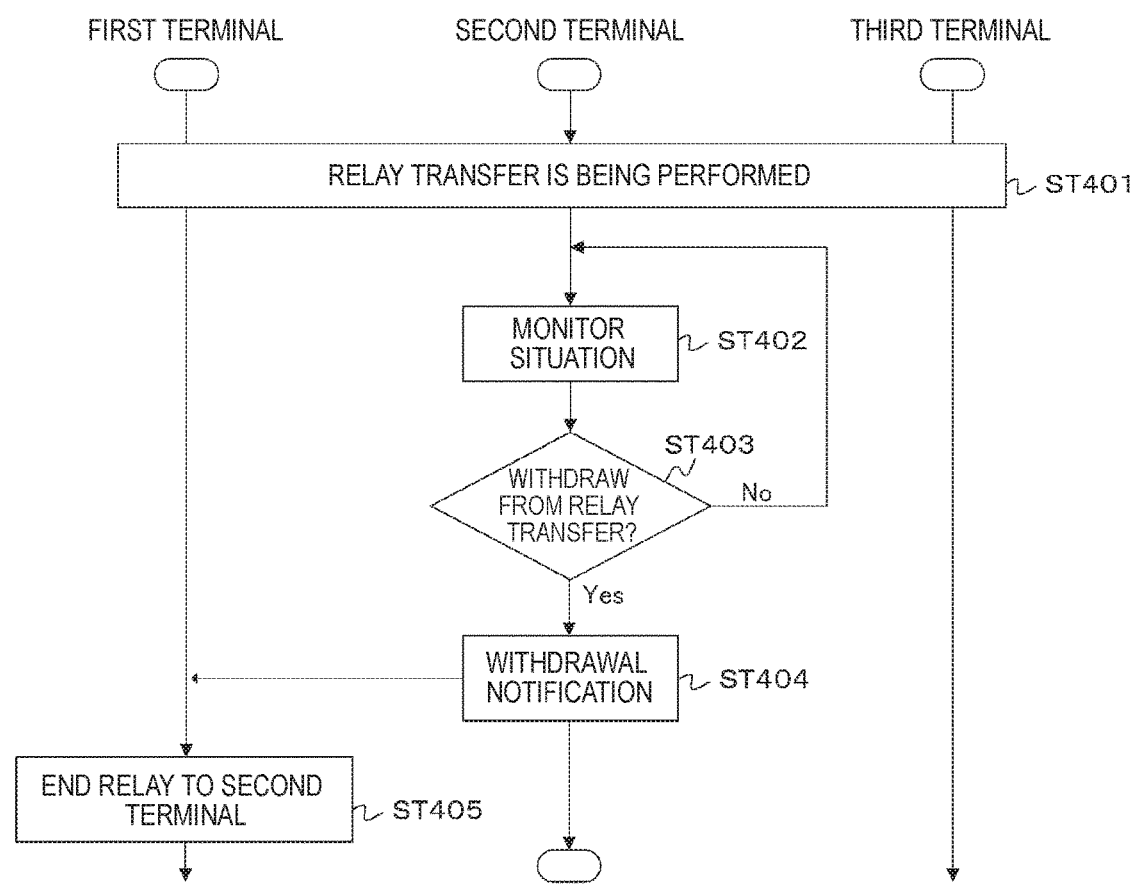
FIG. 16 is a flowchart showing an example of a process performed by each terminal in Example 4.

A flowchart of FIG. 16 shows an example of a process performed by each terminal. Here, the second terminals are the second terminal 12A or the second terminal 12B in FIG. 5. In step ST401, each terminal is performing relay transfer. Specifically, data is transmitted from the first terminal to the third terminal while being relayed by the second terminals.

In step ST402, the second terminal performs internal monitoring on a regular basis. Thereafter, in step ST403, the second terminal determines whether to withdraw from relay transfer, on the basis of information possessed by itself, such as public network wireless connection information, terminal information, short-range wireless connection information, transfer withdrawal condition information, external compulsory withdrawal information, and the like.

Specifically, for example, the second terminal determines to withdraw from relay transfer if one or more of the following conditions are satisfied:

the first terminal and the second terminal are separated from each other by a distance the amount of charge remaining in the battery decreases (becomes lower than a predetermined threshold)

a public wireless network is disconnected or the quality thereof decreases (contribution to the overall transfer becomes lower than a required threshold)

the quality of short-range wireless communication decreases (throughput estimated from link quality information becomes lower than a threshold)

the communication capacity available for a public network is exceeded

Moreover, for example, when there is previously a request for compulsory withdrawal, from a cloud, such as the third terminal or the like, the second terminal may determine to withdraw, irrespective of determination based on other information.

If the second terminal determines not to withdraw, control returns to the process of step ST402, in which the second terminal internally monitors the situation on a regular basis. Meanwhile, if the second terminal determines to withdraw, the second terminal notifies the first terminal of withdrawal in step ST404. For example, the second terminal sends a withdrawal declaration message as a withdrawal notification to the first terminal. In step ST405, the first terminal, when notified of withdrawal by the second terminal, stops transmitting data to be transferred, to the second terminal. As a result, the second terminal withdraws from relay transfer.

Thus, in Example 4, a second terminal participating in relay transfer internally monitors the situation on a regular basis to determine whether to withdraw from relay transfer, and when determining to withdraw, notifies the first terminal of withdrawal. The first terminal, when receiving the withdrawal notification, stops transmitting data to be transferred, to the second terminal. Therefore, the second terminal can satisfactorily withdraw from relay transfer according to the situation.

Example 5: During Relay Transfer, the First Terminal Causes a Second Terminal to Withdraw A communication system of Example 5 has a configuration similar to that of the communication system 10A of Example 1 (see FIG. 5). In Example 5, the first terminal determines whether to cause a second terminal to withdraw from relay transfer, on the basis of a state of the second terminal participating in relay transfer.

A flowchart of FIG. 17 shows an example of a process performed by each terminal. Here, a second terminal refers to the second terminal 12A or the second terminal 12B in FIG. 5. In step ST501, each terminal is performing relay transfer. Specifically, data is transmitted from the first terminal to the third terminal while being relayed by the second terminal.

In step ST502, the second terminal updates the situation (the quality of short-range wireless communication, the state of public network connection, the amount of charge remaining in the battery, the remaining capacity of available communication, etc.) with respect to the first terminal. In step ST503, the first terminal monitors the situation on a regular basis. Thereafter, in step ST504, the first terminal determines whether to cause the second terminal to withdraw from relay transfer, on the basis of information possessed by itself and information received from the second terminal.

Examples of the information possessed by the second terminal itself include public network connection information of other terminal devices participating in relay transfer, information about data to be transferred, short-range wireless connection information with the second terminal, and the like. Examples of the received information include public network wireless connection information, terminal information, short-range wireless connection information, transfer withdrawal condition information, external compulsory withdrawal information, and the like.

Specifically, for example, the first terminal determines to cause the second terminal to withdraw from relay transfer if one or more of the following conditions are satisfied:

the first terminal and the second terminal are separated from each other by a distance the amount of charge remaining in the battery decreases (becomes lower than a predetermined threshold)

a public wireless network is disconnected or the quality thereof decreases (contribution to the overall transfer becomes lower than a required threshold)

the quality of short-range wireless communication decreases (throughput estimated from link quality information becomes lower than a threshold)

the communication capacity available for a public network is exceeded

Moreover, for example, when there is previously a request for compulsory withdrawal, from a cloud, such as the third terminal or the like, the second terminal may determine to cause the second terminal to withdraw, irrespective of determination based on other information.

If the first terminal determines not to cause the second terminal to withdraw, control returns to the process of step ST503, in which the first terminal monitors the situation on a regular basis. Meanwhile, if the first terminal determines to cause the second terminal to withdraw, the second terminal notifies the second terminal of withdrawal in step ST505. For example, the first terminal sends a withdrawal message as a withdrawal notification to the second terminal. Thereafter, in step ST506, the first terminal stops transmitting data to be transferred, to the second terminal. As a result, the second terminal withdraws from relay transfer.

Thus, in Example 5, the first terminal monitors the situation on a regular basis during relay transfer, determines whether to cause the second terminal to withdraw from relay transfer, and when determining to cause the second terminal to withdraw, notifies the second terminal of withdrawal, and stops transmitting data to be transferred to the second terminal. Therefore, the first terminal can satisfactorily cause the second terminal to withdraw from relay transfer according to the situation.

As described above, in this embodiment, a scheme to dynamically add or remove a line which is contracted for another purpose can be provided instead of a fixed dedicated line contract or the like, and therefore, a flexible system can be implemented and high-speed transfer can be achieved.

2. VARIATIONS

Moreover, in the above embodiments, all data that are transmitted from the first terminal to the third terminal are relayed and transferred by second terminals. However, there may be a configuration in which the first terminal directly transmits data to the third terminal through a public line network, and in parallel with this, data is transmitted from the first terminal to the third terminal through second terminals. The present technology is, of course, applicable to such a configuration.

Additionally, the present technology may also be configured as below.

(1) A terminal device including:

a terminal search unit that searches for a predetermined transmitter terminal;

a determination unit that determines whether to participate in relay transfer involved in data transmission from the predetermined transmitter terminal found by the terminal search unit to a predetermined receiver terminal, using information possessed by the terminal device; and a notification unit that notifies the predetermined transmitter terminal of participation when the determination unit determines that the terminal device participates.

(2) The terminal device according to (1), wherein the predetermined transmitter terminal communicates with the terminal device using short-range wireless communication, and the predetermined receiver terminal communicates with the terminal device through a public wireless network.

(3) The terminal device according to (2), wherein the information possessed by the terminal device includes at least one of public network wireless connection information, terminal information, and external compulsory participation request information.

(4) The terminal device according to (3), wherein the terminal information includes at least one of information about a battery's remaining power, information about available communication capacity, and information indicating whether communication is currently performed for another purpose.

(5) The terminal device according to one of (2) to (4), further including:

an information reception unit that receives information about the relay transfer from the transmitter terminal found by the terminal search unit, wherein the determination unit performs the determination using the information received by the information reception unit in addition to the information possessed by the terminal device.

(6) The terminal device according to (5), wherein the received information includes at least one of public network connection information of another terminal device participating in relay transfer, information about data to be transferred, short-range wireless connection information with the terminal device, and grant incentive information.

(7) A method for allowing a terminal device to participate in relay transfer, the method including:

a terminal search step of searching for a predetermined transmitter terminal;

a determination step of determining whether to participate in relay transfer involved in data transmission from the predetermined transmitter terminal found in the terminal search step to a predetermined receiver terminal, using information possessed by the terminal device; and a notification step of notifying the predetermined transmitter terminal of participation when it is determined in the determination step that the terminal device participates.

(8) A terminal device including:

a notification reception unit that receives a participation notification of relay transfer from a predetermined terminal device;

a determination unit that determines whether to accept participation of the predetermined terminal device in relay transfer when the notification reception unit receives the participation notification; and a data transmission unit that transmits transmission data to the predetermined receiver terminal through the predetermined terminal device when the determination unit determines to accept the participation.

(9) A terminal device including:

an information reception unit that receives information from a predetermined terminal device connected at a data link level;

a determination unit that determines whether to invite the predetermined terminal device to relay transfer involved in data transmission to a predetermined receiver terminal, using the information received by the information reception unit and information possessed by the terminal device; and a notification unit that notifies the predetermined terminal device of invitation when the determination unit determines to invite the predetermined terminal device.

(10) The terminal device according to (9), wherein the predetermined terminal device communicates with the terminal device using short-range wireless communication, and the predetermined receiver terminal communicates with the predetermined terminal device through a public wireless network.

(11) The terminal according to (10), wherein the received information includes one of public network wireless connection information, terminal information, and transfer participation condition information, and the information possessed by the terminal device include one of public network connection information of another terminal device participating in relay transfer, information about data to be transferred, and short-range wireless connection information with the predetermined terminal device.

(12) The terminal device according to any of (9) to (11), further including:

a data transmission unit that transmits transmission data to the predetermined terminal device when the terminal device is notified of participation in relay transfer by the predetermined terminal device in response to the invitation notification.

(13) A method for inviting a terminal device to relay transfer, the method including:

an information reception step of receiving information from a predetermined terminal device connected at a data link level;

a determination step of determining whether to invite the predetermined terminal device to relay transfer involved in data transmission to a predetermined receiver terminal, using the information received in the information reception step and information possessed by the terminal device; and a notification step of notifying the predetermined terminal device of invitation when the determination step determines to invite the predetermined terminal device.

(14) A terminal device including:

a notification reception unit that receives an invitation notification to relay transfer involved in data transmission to a predetermined receiver terminal, from a predetermined transmitter terminal connected at a data link layer level;

a determination unit that determines whether to accept the invitation to relay transfer when the notification reception unit receives the invitation notification; and a notification unit that notifies the predetermined terminal device of participation in relay transfer when the determination unit determines to accept the invitation.

(15) A terminal device including:

a determination unit that determines whether to withdraw from relay transfer involved in data transmission from a predetermined transmitter terminal to a predetermined receiver terminal, using information possessed by the terminal device; and a notification unit that notifies the predetermined transmitter terminal of withdrawal when the determination unit determines that the terminal device withdraws.

(16) The terminal device according to (15), wherein the predetermined transmitter terminal communicates with the terminal device using short-range wireless communication, and the predetermined receiver terminal communicates with the terminal device through a public wireless network.

(17) The terminal device according to (16), wherein the information possessed by the terminal device includes at least one of public network wireless connection information, terminal information, short-range wireless connection information, transfer withdrawal condition information, and external compulsory withdrawal information.

(18) A terminal device including:

a determination unit that determines whether to cause a predetermined terminal device to withdraw from relay transfer involved in data transmission from the terminal device to a predetermined receiver terminal, using information possessed by the terminal device and information received from the predetermined terminal device; and a notification unit that notifies the predetermined terminal device of withdrawal from relay transfer when the determination unit determines to cause the predetermined terminal device to withdraw.

(19) The terminal device according to (18), wherein the predetermined terminal device communicates with the terminal device using short-range wireless communication, and the predetermined receiver terminal communicates with the predetermined terminal device through a public wireless network.

(20) The terminal device according to (19), wherein the received information includes at least one of public network wireless connection information, terminal information, short-range wireless connection information, transfer withdrawal condition information, and external compulsory withdrawal information, and the information possessed by the terminal device includes at least one of public network connection information of another terminal device participating in relay transfer, information about data to be transferred, and short-range wireless connection information with the predetermined terminal device.

REFERENCE SYMBOLS LIST

10, 10A communication system
11 first terminal
12, 12A-12C second terminal
13 third terminal
101 communication unit
102 connection management unit
103 transfer control unit
104 memory
106 storage
201, 202 communication unit
203 connection management unit
204 relay control unit
205 memory 301 communication unit
302 transfer control unit
303 memory
304 storage

The invention claimed is:

1. A terminal device comprising:
processing circuitry configured to:
determine whether a condition for starting a search for a predetermined transmitter terminal is satisfied, the condition including at least one of a predetermined time in which the terminal device is allowed to participate in a relay transfer with the predetermined transmitter terminal, a current position of the terminal is within a predetermined distance of the predetermined transmitter terminal, and a notification of a request for search is received from a predetermined receiver terminal,
search for the predetermined transmitter terminal when the condition for starting the search is satisfied, the search for the predetermined transmitter terminal being based on specific information of the predetermined transmitter terminal including a network identifier, a device name of the predetermined transmitter terminal, and a service name provided by the predetermined transmitter terminal,
determine whether to participate in relay transfer involved in data transmission from the predetermined transmitter terminal found by the search to the predetermined receiver terminal, and
notify the predetermined transmitter terminal of participation when public network wireless connection to the predetermined receiver terminal is within range, an amount of charge remaining in a battery of the terminal device is sufficient for the relay transfer, a communication capacity available for transfer in public network wireless connection is sufficient for the relay transfer, and the terminal device is not using public network wireless communication for another purpose.

2. The terminal device according to claim 1,
wherein the predetermined transmitter terminal communicates with the terminal device using short-range wireless communication, and
the predetermined receiver terminal communicates with the terminal device through a public wireless network.

3. The terminal device according to claim 2,
wherein the information possessed by the terminal device includes at least one of public network wireless connection information, terminal information, and external compulsory participation request information.

4. The terminal device according to claim 3,
wherein the terminal information includes at least one of information about a battery's remaining power, information about available communication capacity, and information indicating whether communication is currently performed for another purpose, wherein communication for another purpose corresponds to the terminal device being contracted for communication that does not initially include the relay transfer.

5. The terminal device according to claim 2, wherein the processing circuitry is further configured to:
receive information about the relay transfer from the predetermined transmitter terminal found by the search.

6. The terminal device according to claim 5,
wherein the received information includes at least one of public network connection information of another terminal device participating in relay transfer, information about data to be transferred, short-range wireless connection information with the terminal device, and grant incentive information.

7. A method for allowing a terminal device to participate in relay transfer, the method comprising:
determining, via processing circuitry, whether a condition for starting a search for a predetermined transmitter terminal is satisfied, the condition including at least one of a predetermined time in which the terminal device is allowed to participate in a relay transfer with the predetermined transmitter terminal, a current position of the terminal is within a predetermined distance of the predetermined transmitter terminal, and a notification of a request for search is received from a predetermined receiver terminal;
searching, via the processing circuitry, for the predetermined transmitter terminal when the condition for starting the search is satisfied, the search for the predetermined transmitter terminal being based on specific information of the predetermined transmitter terminal including a network identifier, a device name of the predetermined transmitter terminal, and a service name provided by the predetermined transmitter terminal;
determining, via the processing circuitry, whether to participate in relay transfer involved in data transmission from the predetermined transmitter terminal found in the search to the predetermined receiver terminal, using information possessed by the terminal device; and
notifying, via the processing circuitry, the predetermined transmitter terminal of participation when public network wireless connection to the predetermined receiver terminal is within range, an amount of charge remaining in a battery of the terminal device is sufficient for the relay transfer, a communication capacity available for transfer in public network wireless connection is sufficient for the relay transfer, and the terminal device is not using public network wireless communication for another purpose.

8. A terminal device comprising:
processing circuitry configured to:
receive a participation notification of relay transfer from a predetermined relay terminal device when public network wireless connection to a predetermined receiver terminal is within range, an amount of charge remaining in a battery of the terminal relay device is sufficient for the relay transfer, a communication capacity available for transfer in public network wireless connection is sufficient for the relay transfer, and the predetermined relay terminal device is not using public network wireless communication for another purpose,
determine whether to accept participation of the predetermined relay terminal device in relay transfer between the terminal device and the predetermined receiver terminal when the participation notification is received, and
transmit transmission data to the predetermined receiver terminal through the predetermined relay terminal device when the terminal device accepts the participation.

* * * * *